(12) United States Patent
Baker et al.

(10) Patent No.: US 12,444,894 B2
(45) Date of Patent: Oct. 14, 2025

(54) SMART ADAPTOR ASSEMBLY

(71) Applicant: EMERGENCY TECHNOLOGY, INC., Hudsonville, MI (US)

(72) Inventors: Douglas V. Baker, Hudsonville, MI (US); Michael Walma, Hudsonville, MI (US)

(73) Assignee: Emergency Technology, Inc., Hudsonville, MI (US)

( * ) Notice: Subject to any disclaimer, the term of this patent is extended or adjusted under 35 U.S.C. 154(b) by 52 days.

(21) Appl. No.: 18/303,873

(22) Filed: Apr. 20, 2023

(65) Prior Publication Data

US 2023/0253745 A1 Aug. 10, 2023

Related U.S. Application Data

(63) Continuation of application No. 16/782,588, filed on Feb. 5, 2020, now Pat. No. 11,670,900.

(60) Provisional application No. 62/801,163, filed on Feb. 5, 2019.

(51) Int. Cl.
| | |
|---|---|
| *H01R 31/06* | (2006.01) |
| *B60R 16/02* | (2006.01) |
| *F21V 19/00* | (2006.01) |
| *H01R 13/66* | (2006.01) |
| *H01R 33/94* | (2006.01) |

(52) U.S. Cl.
CPC ......... *H01R 31/06* (2013.01); *B60R 16/0207* (2013.01); *F21V 19/001* (2013.01); *H01R 13/6658* (2013.01); *H01R 33/94* (2013.01)

(58) Field of Classification Search
CPC .... H01R 31/06; H01R 13/6658; H01R 33/94; B60R 16/0207; F21V 19/001

USPC ......................................................... 439/638
See application file for complete search history.

(56) References Cited

U.S. PATENT DOCUMENTS

| | | | |
|---|---|---|---|
| 664,262 A | 12/1900 | Gaunt | |
| 3,654,512 A | 4/1972 | Spiteri | |
| 3,735,116 A * | 5/1973 | Morrison | B60Q 1/2615 |
| | | | 439/220 |
| 3,742,429 A | 6/1973 | Morrison | |
| 3,748,458 A | 7/1973 | Morrison et al. | |
| 3,778,016 A | 12/1973 | Gernhardt et al. | |
| 3,811,042 A | 5/1974 | Morrison | |
| 3,895,228 A | 7/1975 | Roller et al. | |
| 4,241,371 A | 12/1980 | Sage | |
| 4,437,145 A * | 3/1984 | Roller | F21V 15/04 |
| | | | 362/519 |
| 4,565,345 A | 1/1986 | Templeman | |

(Continued)

FOREIGN PATENT DOCUMENTS

| | | |
|---|---|---|
| AU | 1998066631 A | 9/1998 |
| AU | 2001270926 | 1/2002 |

(Continued)

*Primary Examiner* — Harshad C Patel
(74) *Attorney, Agent, or Firm* — McGarry Bair PC

(57) ABSTRACT

A method and apparatus for a lighting assembly for a vehicle can include a housing assembly and a set of adaptors. Vehicles today are often limited to specific wiring harnesses or connection types based upon manufacturer. Each adaptor of the set of adaptors can include a different connection type. The adaptors are interchangeably connectable to the housing assembly in order to vary the connection type based upon the specific wiring harness or connection type of the particular vehicle.

19 Claims, 8 Drawing Sheets

(56) References Cited

U.S. PATENT DOCUMENTS

| | | | |
|---|---|---|---|
| 4,739,130 A * | 4/1988 | Roller | B60Q 1/343 |
| | | | 200/61.54 |
| 4,740,876 A * | 4/1988 | Roller | F21V 15/04 |
| | | | 362/519 |
| 4,781,393 A * | 11/1988 | Jeter | H01R 35/02 |
| | | | 439/35 |
| 4,812,955 A * | 3/1989 | Beswick | F21S 43/51 |
| | | | 362/306 |
| 4,910,494 A * | 3/1990 | Tamai | B60W 10/02 |
| | | | 701/114 |
| 5,281,147 A * | 1/1994 | Hughes | H01R 13/502 |
| | | | 439/35 |
| 5,508,894 A | 4/1996 | Payne et al. | |
| 5,567,036 A | 10/1996 | Theobald et al. | |
| 5,632,551 A | 5/1997 | Roney et al. | |
| 5,739,592 A | 4/1998 | Rigsby et al. | |
| 5,766,020 A * | 6/1998 | Hughes | H01R 31/065 |
| | | | 439/35 |
| 5,854,517 A | 12/1998 | Hines | |
| 5,920,128 A | 7/1999 | Hines | |
| 5,993,262 A | 11/1999 | Kowdynski et al. | |
| 6,005,300 A | 12/1999 | Kelly | |
| 6,007,346 A * | 12/1999 | Gutierrez | H01R 29/00 |
| | | | 439/35 |
| 6,015,219 A | 1/2000 | Kelly | |
| 6,153,975 A * | 11/2000 | Perdec | B60R 16/0207 |
| | | | 307/10.1 |
| 6,241,373 B1 | 6/2001 | Kelley et al. | |
| 6,265,829 B1 * | 7/2001 | Perdec | B60R 16/0207 |
| | | | 307/10.8 |
| 6,292,718 B2 | 9/2001 | Staiger | |
| 6,305,945 B1 | 10/2001 | Vance | |
| 6,396,210 B1 * | 5/2002 | Menze | B60Q 1/305 |
| | | | 362/487 |
| 6,413,101 B2 | 7/2002 | Divoll et al. | |
| 6,414,801 B1 | 7/2002 | Roller | |
| 6,502,975 B1 | 1/2003 | Branstetter | |
| 6,518,524 B1 | 2/2003 | Brandt et al. | |
| 6,558,167 B2 | 5/2003 | Harmon et al. | |
| 6,612,728 B2 | 9/2003 | Roller et al. | |
| 6,642,628 B2 | 11/2003 | Burdick et al. | |
| 6,709,275 B1 | 3/2004 | Ihde | |
| 6,749,438 B1 | 6/2004 | Scheller et al. | |
| 6,758,587 B2 | 7/2004 | Stephens et al. | |
| 6,866,397 B2 | 3/2005 | Cheng et al. | |
| 6,947,104 B2 | 9/2005 | Yu et al. | |
| 6,976,883 B2 | 12/2005 | Andres et al. | |
| 7,034,793 B2 | 4/2006 | Sekiya et al. | |
| 7,090,506 B2 | 8/2006 | Sung et al. | |
| 7,113,236 B2 | 9/2006 | Du | |
| 7,119,293 B1 | 10/2006 | Dua | |
| 7,153,008 B2 | 12/2006 | Grote, III et al. | |
| 7,225,065 B1 * | 5/2007 | Hunt | H01R 12/675 |
| | | | 701/33.2 |
| 7,245,203 B2 | 7/2007 | Stephens et al. | |
| 7,278,871 B2 | 10/2007 | Maschler | |
| 7,286,192 B2 | 10/2007 | Lin et al. | |
| 7,292,211 B2 | 11/2007 | Chao et al. | |
| 7,309,836 B2 | 12/2007 | Lubanski | |
| 7,331,792 B2 | 2/2008 | Cummings et al. | |
| 7,350,326 B2 | 4/2008 | Hu | |
| 7,351,111 B2 | 4/2008 | Cheng | |
| 7,379,138 B2 | 5/2008 | Tung et al. | |
| 7,385,139 B2 | 6/2008 | Lubanski | |
| 7,406,338 B2 | 7/2008 | Chen | |
| 7,413,332 B2 | 8/2008 | Hsieh et al. | |
| 7,427,985 B2 | 9/2008 | Chen et al. | |
| 7,434,978 B2 | 10/2008 | Chou | |
| 7,435,093 B1 | 10/2008 | Harmon et al. | |
| 7,460,102 B2 | 12/2008 | Lee | |
| 7,491,559 B2 | 2/2009 | Peng | |
| 7,534,108 B1 | 5/2009 | Wang | |
| 7,567,312 B2 | 7/2009 | Lin et al. | |
| 7,581,866 B2 | 9/2009 | Shao et al. | |
| 7,592,547 B2 | 9/2009 | Lubanski | |
| 7,594,816 B1 | 9/2009 | Wang | |
| 7,595,450 B2 | 9/2009 | Lubanski | |
| 7,595,780 B2 | 9/2009 | Katagawa et al. | |
| 7,612,298 B2 | 11/2009 | Lung et al. | |
| 7,658,524 B2 | 2/2010 | Johnson et al. | |
| 7,674,980 B2 | 3/2010 | Lubanski | |
| 7,683,988 B2 | 3/2010 | Lin et al. | |
| 7,688,396 B2 | 3/2010 | Yang et al. | |
| 7,750,372 B2 | 7/2010 | Chang | |
| 7,779,539 B2 | 8/2010 | Chen et al. | |
| 7,795,535 B2 | 9/2010 | Lubanski | |
| 7,804,482 B2 | 9/2010 | Hsu et al. | |
| 7,838,772 B2 | 11/2010 | Lubanski | |
| 7,868,357 B2 | 1/2011 | Chang | |
| 7,868,976 B2 | 1/2011 | Lin et al. | |
| 7,888,695 B2 | 2/2011 | Lin et al. | |
| 7,911,556 B2 | 3/2011 | Yang et al. | |
| 7,943,851 B2 | 5/2011 | Lubanski | |
| 7,967,617 B2 | 6/2011 | Vonnegut et al. | |
| 7,973,874 B2 | 7/2011 | Lao | |
| 7,976,328 B2 | 7/2011 | Tsai et al. | |
| 8,008,584 B2 | 8/2011 | Tu et al. | |
| 8,018,180 B2 | 9/2011 | Lee et al. | |
| 8,022,402 B2 | 9/2011 | Li et al. | |
| 8,043,120 B2 | 10/2011 | Tsai et al. | |
| 8,052,302 B2 | 11/2011 | Hsu et al. | |
| 8,057,067 B2 | 11/2011 | Ham et al. | |
| 8,115,215 B2 | 2/2012 | Chang | |
| 8,158,462 B2 | 4/2012 | Lin et al. | |
| 8,192,064 B2 | 6/2012 | Johnson et al. | |
| 8,269,940 B2 | 9/2012 | Kuo et al. | |
| 8,292,462 B2 | 10/2012 | Huang et al. | |
| 8,308,337 B2 | 11/2012 | Yeh | |
| 8,313,349 B2 | 11/2012 | Tsai et al. | |
| 8,334,655 B2 | 12/2012 | Nien et al. | |
| 8,345,179 B2 | 1/2013 | Mo et al. | |
| 8,382,358 B2 | 2/2013 | Pan et al. | |
| 8,399,891 B2 | 3/2013 | Lai et al. | |
| 8,400,763 B2 | 3/2013 | Wang et al. | |
| 8,411,234 B2 | 4/2013 | Liao et al. | |
| 8,421,725 B2 | 4/2013 | Chen et al. | |
| 8,427,414 B2 | 4/2013 | Lin et al. | |
| 8,562,163 B2 | 10/2013 | Lin et al. | |
| 8,643,818 B2 | 2/2014 | Chiu et al. | |
| 8,646,957 B2 | 2/2014 | Johnson et al. | |
| 8,648,337 B2 | 2/2014 | Hsieh | |
| 8,692,742 B2 | 4/2014 | Tsai et al. | |
| 8,716,705 B2 | 5/2014 | Lin et al. | |
| 8,740,628 B2 | 6/2014 | Brooks et al. | |
| 8,754,426 B2 | 6/2014 | Marx et al. | |
| 8,779,292 B2 | 7/2014 | Wang et al. | |
| 8,784,130 B2 | 7/2014 | Scott et al. | |
| 8,872,424 B2 | 10/2014 | Nien et al. | |
| 8,882,296 B2 | 11/2014 | Chen et al. | |
| 8,899,803 B2 | 12/2014 | Marley | |
| 8,922,051 B2 | 12/2014 | Romberger et al. | |
| 8,963,195 B2 | 2/2015 | Brooks et al. | |
| 9,039,270 B1 | 5/2015 | Lee | |
| 9,045,093 B2 | 6/2015 | Dobrow et al. | |
| 9,046,421 B2 | 6/2015 | Land et al. | |
| 9,086,766 B2 | 7/2015 | Hsieh | |
| 9,099,618 B1 | 8/2015 | Perez-Bolivar et al. | |
| 9,103,957 B2 | 8/2015 | Chen et al. | |
| 9,136,441 B2 | 9/2015 | Brooks et al. | |
| 9,148,913 B2 | 9/2015 | Lee et al. | |
| 9,174,503 B2 | 11/2015 | Gramlich et al. | |
| 9,175,820 B2 | 11/2015 | Grote, III et al. | |
| 9,188,293 B1 | 11/2015 | Corporon et al. | |
| 9,198,236 B1 | 11/2015 | Richardson, II et al. | |
| 9,201,531 B2 | 12/2015 | Hsieh et al. | |
| 9,214,614 B2 | 12/2015 | Jones et al. | |
| 9,252,680 B2 | 2/2016 | Huang et al. | |
| 9,299,899 B2 | 3/2016 | Corwin et al. | |
| 9,383,085 B2 | 7/2016 | Sun et al. | |
| 9,496,639 B2 | 11/2016 | Harmon et al. | |
| 9,499,109 B2 | 11/2016 | Armacost et al. | |
| 9,518,711 B2 | 12/2016 | Marley et al. | |
| 9,543,696 B2 * | 1/2017 | Armacost | H01R 13/622 |

(56) References Cited

U.S. PATENT DOCUMENTS

| | | | |
|---|---|---|---|
| 9,572,221 | B2 | 2/2017 | Chang et al. |
| 9,614,139 | B2 | 4/2017 | Corwin et al. |
| 9,709,238 | B2 | 7/2017 | Dunn et al. |
| 9,839,144 | B2 | 12/2017 | Chuang et al. |
| 9,874,931 | B1 | 1/2018 | Koenck et al. |
| 9,917,237 | B2 | 3/2018 | Corwin et al. |
| 10,155,468 | B1 * | 12/2018 | Orazem ............... B60Q 1/0035 |
| 10,308,170 | B2 | 6/2019 | Orazem |
| 10,700,498 | B2 | 6/2020 | Lapushner et al. |
| 11,670,900 | B2 * | 6/2023 | Baker .................... H01R 31/06 |
| | | | 439/638 |
| 2002/0041498 | A1 | 4/2002 | Furst et al. |
| 2003/0165057 | A1 | 9/2003 | Cheng et al. |
| 2005/0083290 | A1 | 4/2005 | Katagawa et al. |
| 2005/0174041 | A1 | 8/2005 | Li |
| 2006/0087600 | A1 | 4/2006 | Lao |
| 2006/0109616 | A1 | 5/2006 | Lee et al. |
| 2006/0119263 | A1 | 6/2006 | Chen et al. |
| 2006/0226785 | A1 | 10/2006 | Lin et al. |
| 2006/0230659 | A1 | 10/2006 | Hu |
| 2006/0244739 | A1 | 11/2006 | Tsai |
| 2006/0274008 | A1 | 12/2006 | Lin et al. |
| 2006/0279670 | A1 | 12/2006 | Tung et al. |
| 2007/0053176 | A1 | 3/2007 | Chou |
| 2007/0095560 | A1 | 5/2007 | Lubanski |
| 2007/0095561 | A1 | 5/2007 | Lubanski |
| 2007/0103932 | A1 | 5/2007 | Hsieh et al. |
| 2007/0105287 | A1 | 5/2007 | Peng |
| 2007/0120478 | A1 | 5/2007 | Lee et al. |
| 2007/0189041 | A1 | 8/2007 | Chen et al. |
| 2007/0193771 | A1 | 8/2007 | Chen et al. |
| 2007/0229441 | A1 | 10/2007 | Liu et al. |
| 2007/0246259 | A1 | 10/2007 | Lubanski |
| 2008/0013340 | A1 | 1/2008 | Shao et al. |
| 2008/0019151 | A1 | 1/2008 | Yang et al. |
| 2008/0079012 | A1 | 4/2008 | Grote et al. |
| 2008/0080163 | A1 | 4/2008 | Grote, III et al. |
| 2008/0093102 | A1 | 4/2008 | Lubanski |
| 2008/0096435 | A1 * | 4/2008 | Mills .................... H01R 31/06 |
| | | | 439/668 |
| 2008/0246899 | A1 | 10/2008 | Tsai et al. |
| 2008/0251797 | A1 | 10/2008 | Chang |
| 2008/0316745 | A1 | 12/2008 | Lin et al. |
| 2009/0153769 | A1 | 6/2009 | Lao |
| 2009/0166632 | A1 | 7/2009 | Chang |
| 2009/0192927 | A1 * | 7/2009 | Berg .................... H01R 13/717 |
| | | | 705/412 |
| 2009/0194328 | A1 | 8/2009 | Lubanski |
| 2009/0194342 | A1 | 8/2009 | Kuo et al. |
| 2009/0243500 | A1 | 10/2009 | Hsu et al. |
| 2009/0244416 | A1 | 10/2009 | Liao et al. |
| 2009/0255712 | A1 | 10/2009 | Lubanski |
| 2009/0283298 | A1 | 11/2009 | Lubanski |
| 2010/0013507 | A1 | 1/2010 | Tu et al. |
| 2010/0018742 | A1 | 1/2010 | Lubanski |
| 2010/0062651 | A1 | 3/2010 | Tsai et al. |
| 2010/0073913 | A1 | 3/2010 | Yeh |
| 2010/0084659 | A1 | 4/2010 | Chang |
| 2010/0140615 | A1 | 6/2010 | Li et al. |
| 2010/0141567 | A1 | 6/2010 | Chen et al. |
| 2010/0224388 | A1 | 9/2010 | Lubanski |
| 2010/0227491 | A1 | 9/2010 | Tsai et al. |
| 2010/0259149 | A1 | 10/2010 | Nien et al. |
| 2010/0277931 | A1 | 11/2010 | Ham et al. |
| 2010/0320886 | A1 | 12/2010 | Sung et al. |
| 2011/0019121 | A1 | 1/2011 | Mo et al. |
| 2011/0050550 | A1 | 3/2011 | Tsai et al. |
| 2011/0050682 | A1 | 3/2011 | Lin et al. |
| 2011/0072653 | A1 | 3/2011 | Lin et al. |
| 2011/0080748 | A1 | 4/2011 | Huang et al. |
| 2011/0096268 | A1 | 4/2011 | Hsu et al. |
| 2011/0101409 | A1 | 5/2011 | Barnett |
| 2011/0109830 | A1 | 5/2011 | Wang et al. |
| 2011/0115996 | A1 | 5/2011 | Lin et al. |
| 2011/0128722 | A1 | 6/2011 | Pan et al. |
| 2011/0149569 | A1 | 6/2011 | Hsu et al. |
| 2011/0155460 | A1 | 6/2011 | Wang et al. |
| 2011/0234098 | A1 | 9/2011 | Lin et al. |
| 2012/0015562 | A1 | 1/2012 | Tsai et al. |
| 2012/0038846 | A1 | 2/2012 | Chiu et al. |
| 2012/0043558 | A1 | 2/2012 | Lai et al. |
| 2012/0169626 | A1 | 7/2012 | Hsieh |
| 2012/0281424 | A1 | 11/2012 | Hansen et al. |
| 2013/0026504 | A1 | 1/2013 | Marx et al. |
| 2013/0027955 | A1 | 1/2013 | Grote, III et al. |
| 2013/0027976 | A1 | 1/2013 | Robbins et al. |
| 2013/0038208 | A1 | 2/2013 | Nien et al. |
| 2013/0056769 | A1 | 3/2013 | Chen et al. |
| 2013/0256703 | A1 | 10/2013 | Hsieh |
| 2014/0021792 | A1 | 1/2014 | Huang et al. |
| 2014/0022791 | A1 | 1/2014 | Sun et al. |
| 2014/0048777 | A1 | 2/2014 | Lin et al. |
| 2014/0077698 | A1 | 3/2014 | Lee et al. |
| 2014/0084075 | A1 | 3/2014 | Vandelli et al. |
| 2014/0167619 | A1 | 6/2014 | Land et al. |
| 2014/0231109 | A1 | 8/2014 | Hudak et al. |
| 2014/0233257 | A1 | 8/2014 | Cheng |
| 2014/0264401 | A1 | 9/2014 | Brooks et al. |
| 2014/0264423 | A1 | 9/2014 | Brooks et al. |
| 2014/0264424 | A1 | 9/2014 | Brooks et al. |
| 2014/0265837 | A1 | 9/2014 | Dobrow et al. |
| 2014/0328084 | A1 | 11/2014 | Chuang et al. |
| 2014/0334182 | A1 | 11/2014 | Chen et al. |
| 2015/0028376 | A1 | 1/2015 | Corwin et al. |
| 2015/0028377 | A1 | 1/2015 | Jones et al. |
| 2015/0085488 | A1 | 3/2015 | William, III et al. |
| 2015/0131318 | A1 | 5/2015 | Lee |
| 2015/0160749 | A1 | 6/2015 | Hsieh et al. |
| 2015/0222049 | A1 | 8/2015 | Armacost et al. |
| 2015/0236466 | A1 | 8/2015 | Armacost et al. |
| 2015/0327337 | A1 | 11/2015 | Richardson, II et al. |
| 2015/0345723 | A1 | 12/2015 | Corporon et al. |
| 2015/0371972 | A1 | 12/2015 | Jones et al. |
| 2016/0096054 | A1 | 4/2016 | Busch et al. |
| 2016/0172561 | A1 | 6/2016 | Corwin et al. |
| 2016/0214551 | A1 | 7/2016 | Armacost et al. |
| 2016/0215952 | A1 | 7/2016 | Dunn et al. |
| 2016/0326721 | A1 | 9/2016 | Harmon et al. |
| 2016/0324217 | A1 * | 11/2016 | Cameron ............... A24F 40/90 |
| 2016/0381757 | A1 | 12/2016 | Chang et al. |
| 2017/0084807 | A1 | 3/2017 | Corwin et al. |
| 2017/0089534 | A1 | 3/2017 | Marley et al. |
| 2017/0089535 | A1 | 3/2017 | Marley et al. |
| 2017/0116795 | A1 | 4/2017 | Andrus |
| 2017/0254515 | A1 | 9/2017 | Adams |
| 2017/0365760 | A1 | 12/2017 | Ruan et al. |
| 2018/0100640 | A1 | 4/2018 | Perez-Bolivar et al. |

FOREIGN PATENT DOCUMENTS

| | | |
|---|---|---|
| AU | 2004202369 | 6/2004 |
| AU | 2006228019 A1 | 11/2007 |
| AU | 2012315915 | 5/2014 |
| AU | 2012333233 | 6/2014 |
| AU | 2014232873 | 9/2014 |
| CA | 2188993 A1 | 8/1997 |
| CA | 2282588 | 8/1999 |
| CA | 2277630 A1 | 2/2000 |
| CA | 2300107 | 9/2000 |
| CA | 2384330 A1 | 3/2002 |
| CA | 2359784 A1 | 5/2002 |
| CA | 2360895 A1 | 7/2002 |
| CA | 2380726 A1 | 12/2002 |
| CA | 2392340 A1 | 2/2003 |
| CA | 2398429 | 2/2003 |
| CA | 2502337 A1 | 10/2005 |
| CA | 2515931 A1 | 2/2006 |
| CA | 2559092 | 9/2006 |
| CA | 2562357 A1 | 11/2007 |
| CA | 2734423 | 9/2011 |
| CA | 2762643 | 6/2012 |
| CA | 2840240 | 12/2013 |
| CA | 2840244 | 12/2013 |
| CA | 2840245 | 12/2013 |

(56) References Cited

FOREIGN PATENT DOCUMENTS

| | | | |
|---|---|---|---|
| CA | 2849263 A1 | 3/2014 |
| CA | 2853636 | 4/2014 |
| CA | 2854600 | 5/2014 |
| CA | 2843981 | 9/2014 |
| CA | 2843984 | 9/2014 |
| CA | 2843999 | 9/2014 |
| CA | 2857205 A1 | 1/2015 |
| CA | 2857209 A1 | 1/2015 |
| CA | 2911155 A1 | 9/2015 |
| CA | 2910816 A1 | 5/2016 |
| CA | 2945695 A1 | 7/2016 |
| CA | 2940899 A1 | 8/2016 |
| CA | 2947146 A1 | 10/2016 |
| CN | 1556433 A | 12/2004 |
| CN | 1811565 A | 8/2006 |
| CN | 1908769 A | 2/2007 |
| CN | 101169560 A | 4/2008 |
| CN | 101236311 A | 8/2008 |
| CN | 101240890 A | 8/2008 |
| CN | 100426092 C | 10/2008 |
| CN | 101286610 A | 10/2008 |
| CN | 101308287 A | 11/2008 |
| CN | 101329047 A | 12/2008 |
| CN | 100498456 C | 6/2009 |
| CN | 100529909 C | 8/2009 |
| CN | 100590494 C | 2/2010 |
| CN | 101737676 A | 6/2010 |
| CN | 101737684 A | 6/2010 |
| CN | 102012578 A | 4/2011 |
| CN | 102147082 A | 8/2011 |
| CN | 102252185 A | 11/2011 |
| CN | 102262862 A | 11/2011 |
| CN | 102324422 A | 1/2012 |
| CN | 102364567 A | 2/2012 |
| CN | 102620197 A | 8/2012 |
| CN | 102661522 A | 9/2012 |
| CN | 102767731 A | 11/2012 |
| CN | 102798092 A | 11/2012 |
| CN | 102937278 A | 2/2013 |
| CN | 103277711 A | 9/2013 |
| CN | 103363362 A | 10/2013 |
| CN | 103616782 A | 3/2014 |
| CN | 103672575 A | 3/2014 |
| CN | 103672774 A | 3/2014 |
| CN | 103807809 A | 5/2014 |
| CN | 104051594 A | 9/2014 |
| CN | 104051595 A | 9/2014 |
| EP | 1207076 A2 | 5/2002 |
| EP | 1301742 A1 | 4/2003 |
| EP | 1582405 A2 | 10/2005 |
| EP | 1627772 A1 | 2/2006 |
| EP | 1853096 A2 | 11/2007 |
| EP | 2293275 A1 | 3/2011 |
| EP | 1730000 B1 | 10/2011 |
| EP | 2737472 A2 | 6/2014 |
| EP | 2737528 A1 | 6/2014 |
| EP | 2761223 A2 | 8/2014 |
| EP | 2779806 A2 | 9/2014 |
| EP | 2779813 A2 | 9/2014 |
| EP | 2779814 A2 | 9/2014 |
| EP | 2830090 A1 | 1/2015 |
| EP | 2830091 A1 | 1/2015 |
| EP | 2969648 A1 | 1/2016 |
| EP | 1777066 B1 | 7/2016 |
| EP | 2041790 B1 | 8/2016 |
| EP | 3130005 A1 | 2/2017 |
| EP | 3148843 A1 | 4/2017 |
| EP | 3158261 A1 | 4/2017 |
| EP | 2734995 B1 | 11/2017 |
| EP | 2780218 B1 | 4/2018 |
| EP | 2834849 B1 | 4/2018 |
| SE | 1450495 A1 | 6/2014 |
| SE | 1450668 A1 | 8/2014 |
| SE | 538731 C2 | 11/2016 |
| TW | I225560 B | 12/2004 |
| TW | I230827 B | 4/2005 |
| TW | 200521531 A | 7/2005 |
| TW | 200527064 A | 8/2005 |
| TW | I262461 B | 9/2006 |
| TW | 200636638 A | 10/2006 |
| TW | 200712644 A | 4/2007 |
| TW | 200719042 A | 5/2007 |
| TW | 200721885 A | 6/2007 |
| TW | 200804916 A | 1/2008 |
| TW | 200807092 A | 2/2008 |
| TW | 200819718 A | 5/2008 |
| TW | 200914932 A | 4/2009 |
| TW | 200938904 A | 9/2009 |
| TW | 200952268 A | 12/2009 |
| TW | 201003230 A | 1/2010 |
| TW | I321688 B | 3/2010 |
| TW | I326562 B | 6/2010 |
| TW | 201037411 A | 10/2010 |
| TW | 201101825 A | 1/2011 |
| TW | 201113603 A | 4/2011 |
| TW | 201115230 A | 5/2011 |
| TW | I341944 B | 5/2011 |
| TW | 201119528 A | 6/2011 |
| TW | 201122659 A | 7/2011 |
| TW | 201124007 A | 7/2011 |
| TW | I345108 B | 7/2011 |
| TW | I347470 B | 8/2011 |
| TW | 201213937 A | 4/2012 |
| TW | I366953 B | 6/2012 |
| TW | I367368 B | 7/2012 |
| TW | 201240518 A | 10/2012 |
| TW | I381225 B | 1/2013 |
| TW | 201313055 A | 3/2013 |
| TW | 201316863 A | 4/2013 |
| TW | I392932 B | 4/2013 |
| TW | I397750 B | 6/2013 |
| TW | I408444 B | 9/2013 |
| TW | I415537 B | 11/2013 |
| TW | 201406195 A | 2/2014 |
| TW | I437909 B | 5/2014 |
| TW | I442816 B | 6/2014 |
| TW | 201433861 A | 9/2014 |
| TW | 201443525 A | 11/2014 |
| TW | I461115 B | 11/2014 |
| TW | I468805 B | 1/2015 |
| TW | 201518814 A | 5/2015 |
| TW | I487428 B | 6/2015 |
| TW | I487987 B | 6/2015 |
| TW | I516843 B | 1/2016 |
| WO | 1998038053 A2 | 9/1998 |
| WO | 2002004857 A1 | 1/2002 |
| WO | 2005087542 A1 | 9/2005 |
| WO | 2007053418 A2 | 5/2007 |
| WO | 2007126623 A2 | 11/2007 |
| WO | 2008042212 A2 | 4/2008 |
| WO | 2008042213 A2 | 4/2008 |
| WO | 2010011508 A1 | 1/2010 |
| WO | 2011053952 A1 | 5/2011 |
| WO | 2012151249 A1 | 11/2012 |
| WO | 2013016631 A2 | 1/2013 |
| WO | 2013016646 A2 | 1/2013 |
| WO | 2013016652 A1 | 1/2013 |
| WO | 2013043700 A1 | 3/2013 |
| WO | 2013049369 A2 | 4/2013 |
| WO | 2013066379 A2 | 5/2013 |
| WO | 2013149495 A1 | 10/2013 |
| WO | 2014047481 A2 | 3/2014 |
| WO | 2014145572 A1 | 9/2014 |
| WO | 2015156902 A1 | 10/2015 |
| WO | 2015171205 A1 | 11/2015 |
| WO | 2015183392 A1 | 12/2015 |
| WO | 2015195203 A1 | 12/2015 |
| WO | 2016057642 A1 | 4/2016 |
| WO | 2018067678 A1 | 4/2018 |

* cited by examiner

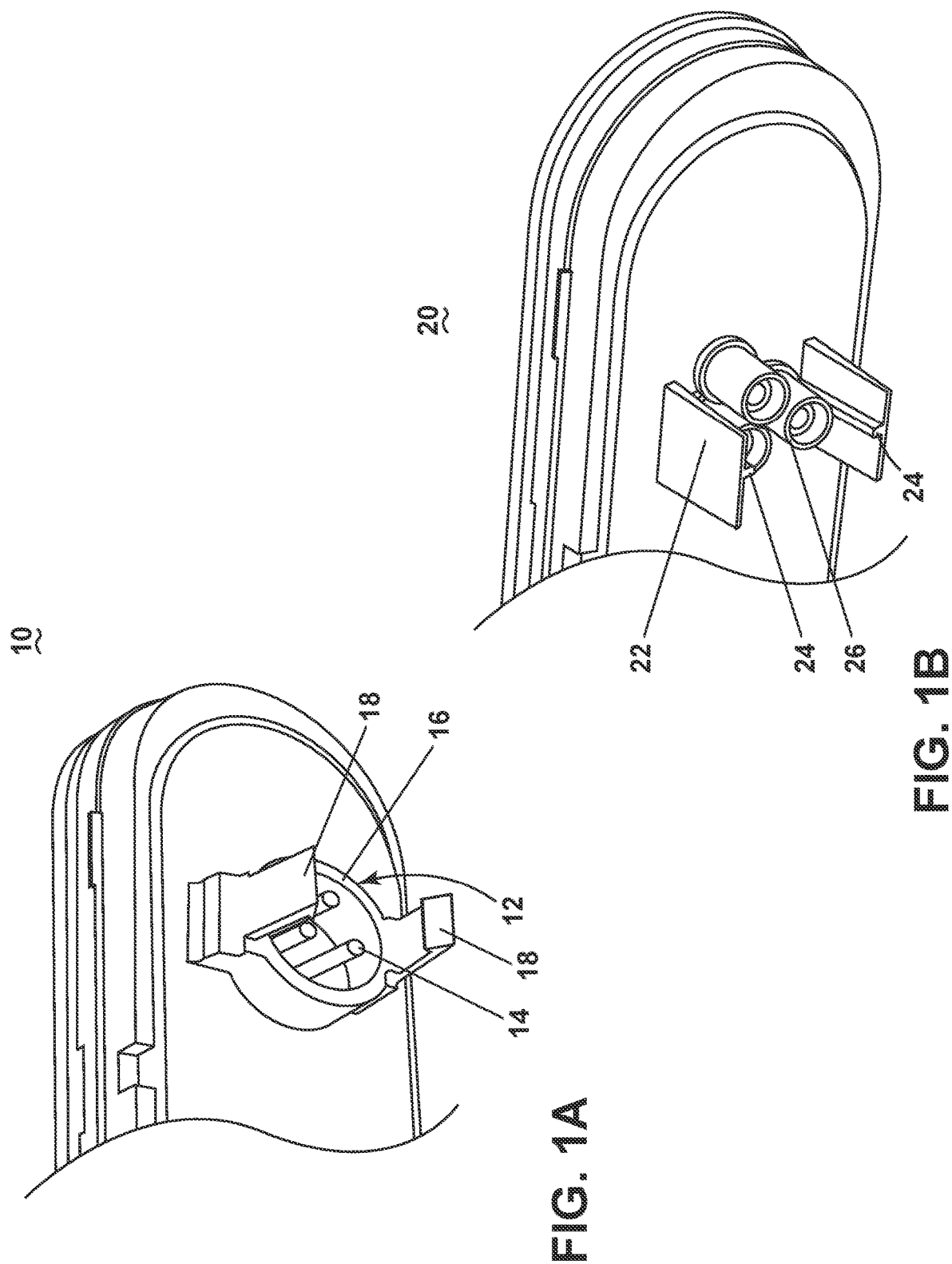

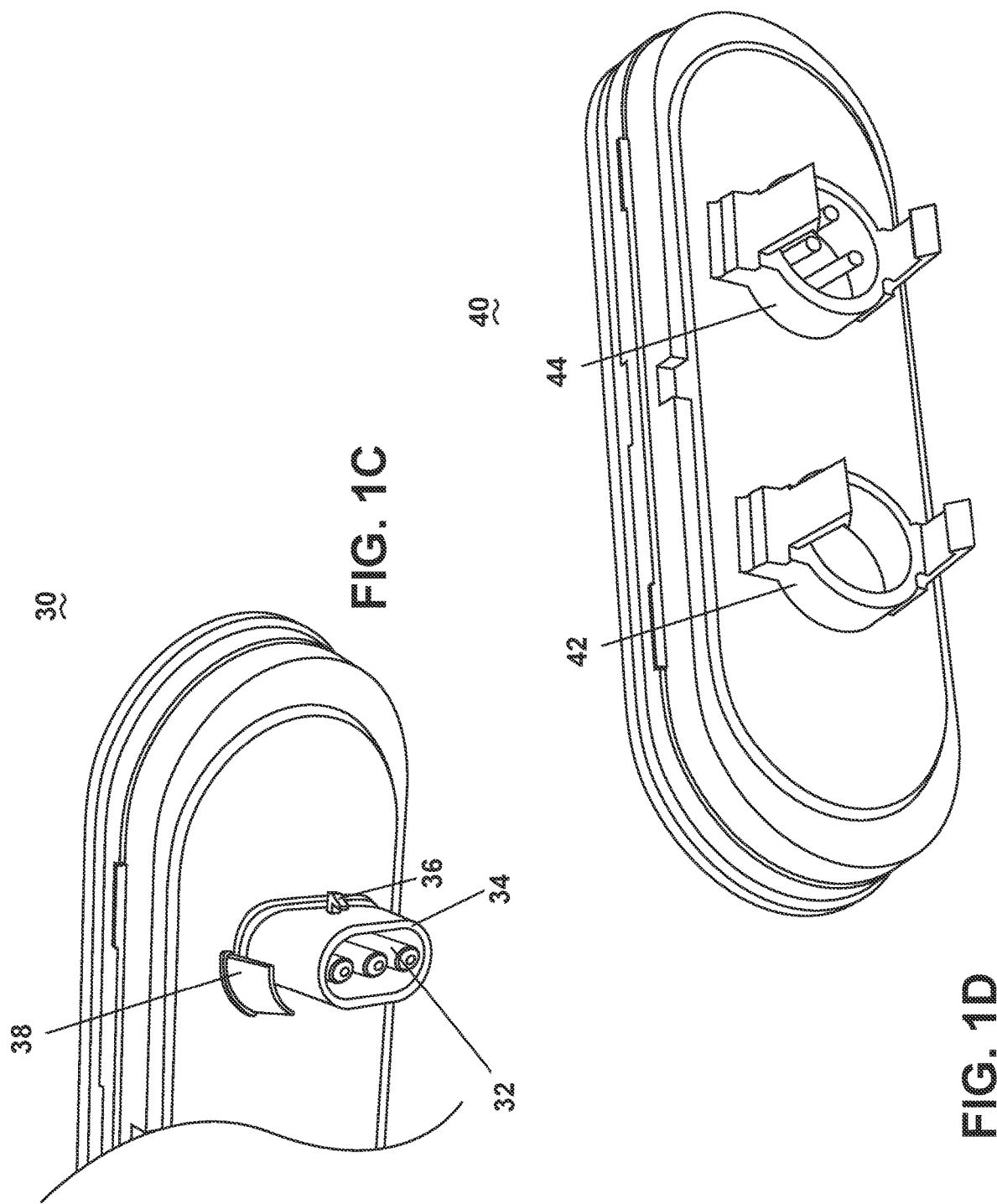

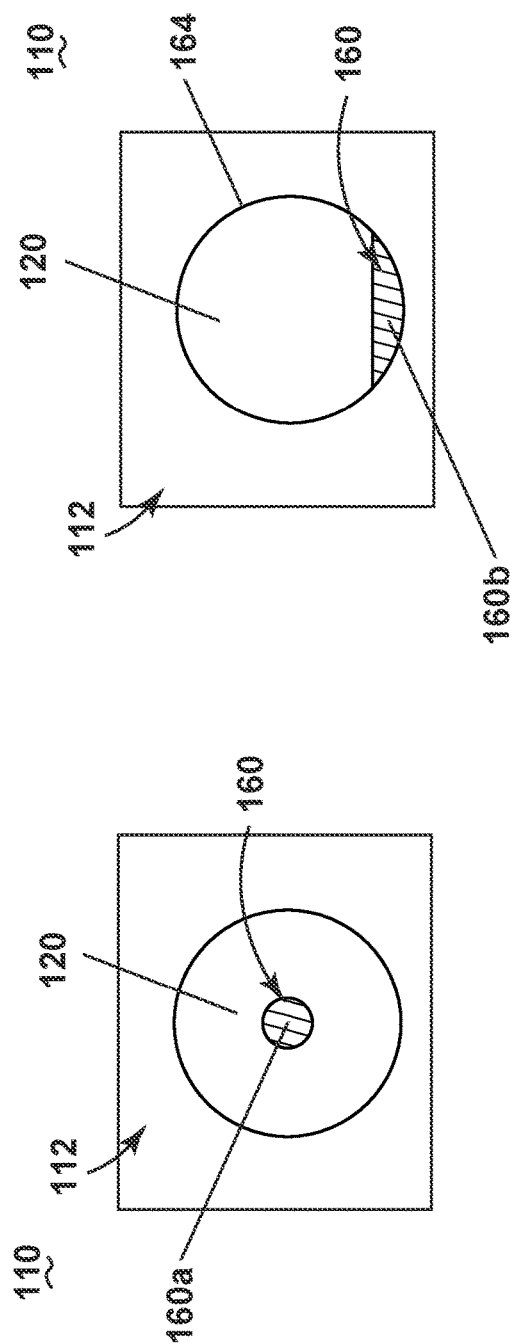
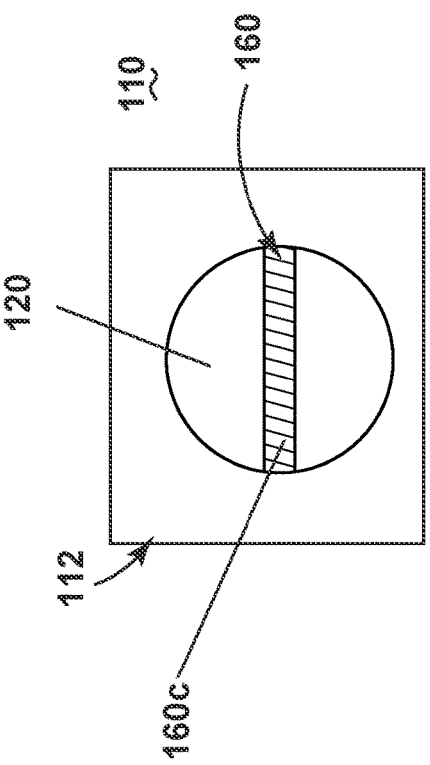
FIG. 4A
FIG. 4B
FIG. 4C

SMART ADAPTOR ASSEMBLY

CROSS REFERENCE TO RELATED APPLICATION

This application is a continuation of U.S. patent application Ser. No. 16/782,588, filed Feb. 5, 2020, now U.S. U.S. Pat. No. 11,670,900, granted on Jun. 6, 2023, which claims priority to and the benefit of U.S. Provisional Patent Application No. 62/801,163 filed Feb. 5, 2019, both of which are incorporated herein in their entirety.

TECHNICAL FIELD

This disclosure generally relates to lighting assemblies that include multiple connection methods. More specifically, this disclosure relates to an interchangeable adaptor integrated into a lighting assembly to support connection among a variety of interface connection types.

BACKGROUND

Vehicle lighting assemblies often use wiring harnesses that have connectors pre-installed to interface with a lighting assembly. Furthermore, manufacturers that supply both lighting assemblies and wiring harnesses have integrated the connector into the lighting assembly, such that the manufacturer-specific wiring harness is required. Thus, there is a need for a connector assembly that can connect to multiple different types of wiring harnesses or connectors.

BRIEF DESCRIPTION

In one aspect, the present disclosure relates to a vehicle lighting assembly comprising: a housing assembly; a light; and an adaptor, removably connectable to the housing assembly, for electrically or communicatively coupling to the housing assembly, whereby the adaptor is replaceable at the housing assembly to interface with different configurations of wiring systems.

In another aspect, the present disclosure relates to a vehicle light adaptor assembly comprising: a housing assembly including a receptacle with an electrical interface; a light coupled to the housing assembly; a set of adaptors, each removably connectable to the housing assembly at the electrical interface, for adapting the housing assembly to connect to a particular type of vehicle wiring harness; an adaptor controller provided within at least one adaptor of the set of adaptors; wherein the set of adaptors are interchangeable with the housing assembly at the receptacle to electrically couple any vehicle wiring harness to the light.

In yet another aspect, the present disclosure relates to a vehicle light adaptor assembly comprising: a housing assembly including a receptacle with an electrical interface; a light coupled to the housing assembly; a set of adaptors, each removably connectable to the housing assembly at the electrical interface, for adapting the housing assembly to connect to a particular type of vehicle wiring harness; a sensor; wherein the set of adaptors are interchangeable with the housing assembly at the receptacle to electrically couple any vehicle wiring harness to the light.

BRIEF DESCRIPTION OF THE DRAWINGS

In the drawings:

FIGS. 1A-1D are four exemplary electrical connectors.

FIGS. 4A-4C show a front view of a lighting assembly with a light, illustrating different positions for a sensor relative to the light.

DETAILED DESCRIPTION

Figure 2:
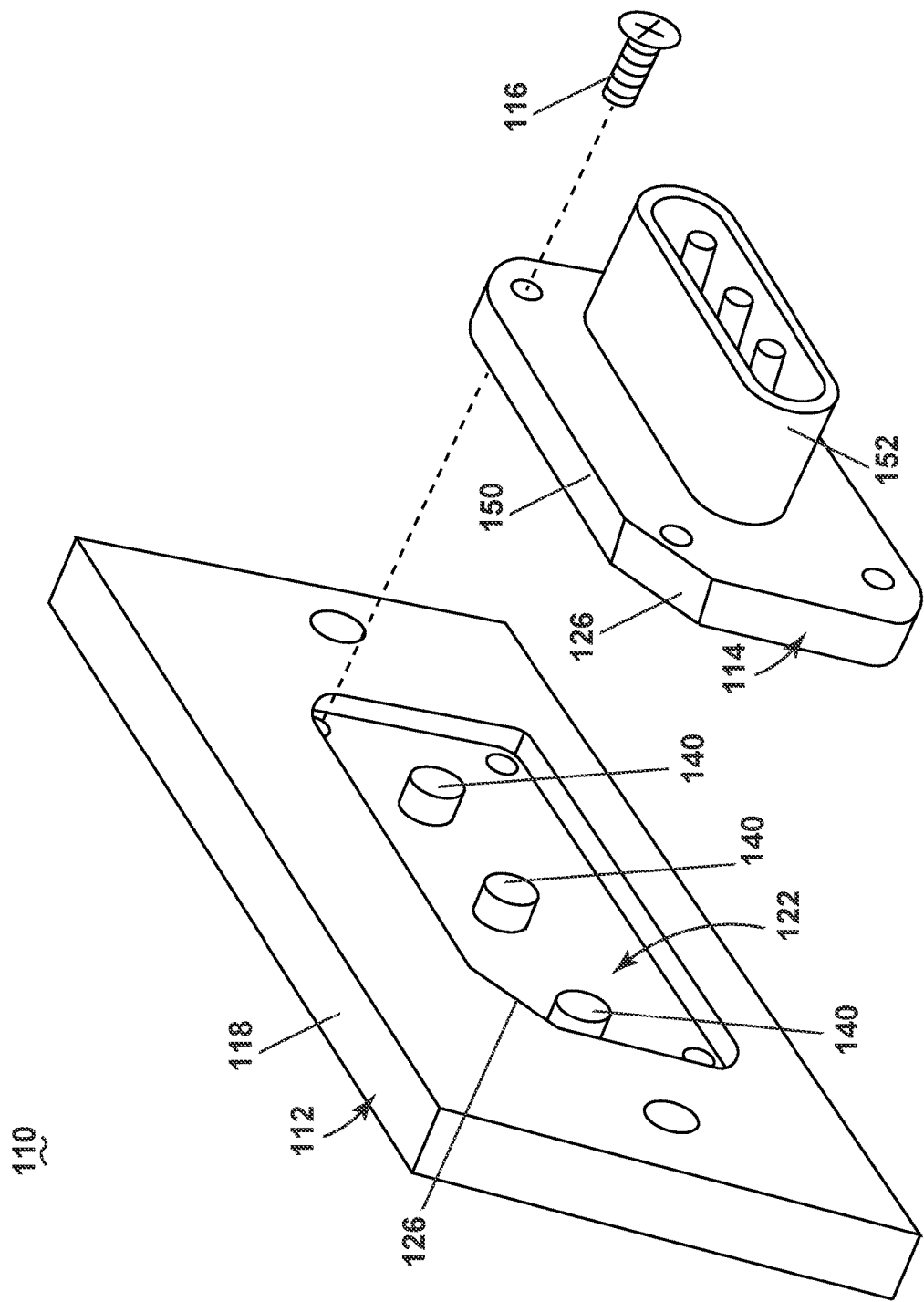
FIG. 2 is an exploded view of a lighting assembly for a vehicle.

Aspects of the disclosure described herein are directed to a method and apparatus for a vehicle electrical system, vehicle communications network, combination thereof, as well as vehicle lighting system. More specifically, the disclosure herein relates to a lighting assembly that includes an interchangeable set of adapters. The interchangeable set of adapters permit a user or installer to change the adapter type which permits the lighting assembly to connect to any type of vehicle, vehicle wiring harness, or vehicle electrical or communication system.

Additionally, as used herein, the terms "radial" or "radially" refer to a direction away from a common center. Furthermore, as used herein, the term "set" or a "set" of elements can be any number of elements, including only one. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

FIGS. 1A-1D show the three types of primary connectors for a vehicle, with FIG. 1D showing an example where one assembly includes two connectors. Referring to FIG. 1A specifically, a connector assembly 10 includes a connector 12, which has three prongs 14 provided with an open-end housing 16. Additionally, two clasps 18 extend from the housing 16, configured to secure a matching or mating electrical connector. More specifically, the connector 12 can be a male connector, adapted to receive a female connector and secure the two together with the clasps 18 holding a female connector (not shown) to the male connector 12.

FIG. 1B is similar to that of the connector 12 in FIG. 1A, except that the connector assembly 20 of FIG. 1B includes three individual or discrete receptacles 26, which are provided between a pair of opposing guides 22. Each guide 22 can include a rib 24 for guiding a complementary connector to mate with the connector assembly 20.

FIG. 1C is also similar to that of the prior connectors 12, 20, except that the connector assembly 30 of FIG. 1C includes three male prongs 32 housed within a racetrackshaped housing 34. The housing can include a tab 36 configured to secure a mating connector (not shown) to the connector assembly 30. A guide 38 can position near, but spaced from the housing 34, acting as a guide to orient and properly align a mating connector (not shown) to the connector assembly 30.

FIG. 1D shows another exemplary connector assembly 40 that includes two different connectors 42, 44. The connectors 42, 44 can be the same as any of those provided in FIGS. 1A-1C.

Original Equipment Manufacturers (OEMs) typically use a single connector type across multiple different vehicle types or manufacturers, resulting in retailers, users, dealerships, or repair shops being required to support multiple different configurations of wiring systems. If an OEM standardizes one type of wiring harness or wiring system, a user will not be able to install a competitor's light if the competitor has a different standardized connector. Furthermore, it is common that different manufacturers, suppliers, or those involved in the industry use different connectors than those of other manufacturers, suppliers or otherwise. Thus, there is a need for a light assembly for a vehicle that can be utilized among multiple OEMs. Without a universal type connector, users or purchasers are limited to purchasing the type of light that conforms to the OEM's specification, or the particular harness or electrical network, or are limited in the items available by the particular OEM.

There are three main types of connectors, as shown in FIGS. 1A-1C. It should be appreciated that the invention is not limited by those connectors shown, and can be made in conformity with any type of connector or wiring harness. Furthermore, it is not uncommon for OEMs to utilize different types of connectors for different parts on a vehicle. Thus, there can be a need for different types of connectors even within the same vehicle.

One solution in the industry is that OEMs are utilizing wiring harnesses that have multiple connectors, so they can utilize different lights. However, users are still limited by the types of connectors that are provided on the wiring harness, and the OEMs making the harnesses are left with higher costs to include the multiple connector harnesses, as well as increased opportunity for failure due to the increased complexity of the harness system. Thus, there is a need for a cost-effective means for a universal connector system that is easy to use, weather resistant, and does not require wiring work or splicing.

Another solution is to utilize a jumper connector or harness to adapt to the particular OEM's harness type. However, the jumper connector is expensive, and can be a significant cost among a fleet of vehicles. Furthermore, the jumper increases the chance of system failure by adding additional elements to the overall system, and increasing complexity.

Yet another solution is to utilize a single molded connector that has more than one connector type, as shown in FIG. 1D. However, similar to the wiring harness with multiple connectors, users are still merely limited to the different connector types on the light assembly, and costs are also increased, often unnecessarily. Furthermore, one of the multiple connectors remains unoccupied, which give rise to the opportunity for failure, or for moisture exposure which can lead to leakage or even corrosion. Further yet, the assembly which includes multiple connector types is larger, which has a negative impact on spacing constraints in a system where spacing concerns already exist. Thus, the solutions that exist still require that the user keeps an inventory to accommodate multiple connector types, or utilize an expensive product capable of supporting multiple different connectors.

FIG. 2 shows an exploded view of a lighting assembly 110, including a body, light body, housing, housing assembly 112 and light adaptor 114. The light adaptor 114 is removably attachable to the housing assembly 112, such as by using a fastener 116, while other fastening means or method are contemplated. The housing assembly 112 can include a housing 118, as well as a light (120, shown in FIG. 3), such as a light emitting diode (LED) or other suitable light source. The housing 118 can be at least partially translucent, such that the light generated by the light 120 is emitted through the housing 118.

The housing 118 can further include a recess 122. The recess 122 can be shaped and sized to receive the light adaptor 114, and such that adjacent exterior surfaces are flush with one another. In this way, it should be appreciated that the recess 122 as shown can be any suitable shape, and any shape, geometry, or design are contemplated. The light adaptor 114 can be made of a soft or compressible material to form a seal when positioned within the recess 122. Alternatively, the recess 122 can include a dedicated seal, such as a gasket or o-ring shaped complementary to the recess 122, which can seal the connection between the light adaptor 114 and the housing assembly 112. Additionally, such a seal can provide for waterproofing or weatherproofing the lighting assembly 110 at the electrical connection between the housing assembly 112 and the light adaptor 114. Furthermore, the seal can provide for reducing or minimizing vibrations at the lighting assembly 110. Preferably, the light adaptor 114 or a dedicated seal is made from a somewhat flexible material to provide vibration attenuation in addition to weatherproofing, while also being wear resistant. The recess 122 can also include a clocking feature 126, or keyway, such as a truncated corner, for one of the corners of the recess 122, as shown. Such a clocking feature 126, or keyway, provides for limiting the connection between the housing assembly 112 and the light adaptor 114, such that only a single orientation provides for connection among the two. A required orientation can ensure proper connection between the light adaptor 114 and the housing assembly 112.

An electrical interface 140, shown as a generic three-pin connection, can be provided within the recess 122. The electrical interface 140 can provide for interfacing or electrically coupling the light adaptor 114 to the housing assembly 112. The electrical interface 140 can be a standardized electrical interface, which can be common to a plurality of different adaptors. A generic electrical interface can be utilized, which can be common to a plurality of different types of light adaptors 114, and a particular connection type is not needed. Similarly, the light adaptor 114 can include a complementary electrical interface receptacle or receiver, best seen in FIG. 3, for electrically coupling the light adaptor 114 to the housing assembly 112. In this way, the light assembly 110 is powered and operated via the light adaptor 114. Furthermore, the electrical interface 140 provides communication between components within the light assembly 110, such as a sensor, a light, a controller or circuit board, transceiver, or any other electrical component.

The light adaptor 114 can include a housing 150 and an adaptor connector 152. The housing 150 can be made of a softer material than that of the housing assembly 112, such that it conforms to the housing assembly 112 to form a seal. The adaptor connector 152 can be vehicle or harness specific. For example, the adaptor connector 152 can be the same as those used in the industry, such as that of FIGS. 1A-1C, while other suitable connectors are contemplated.

Figure 3:
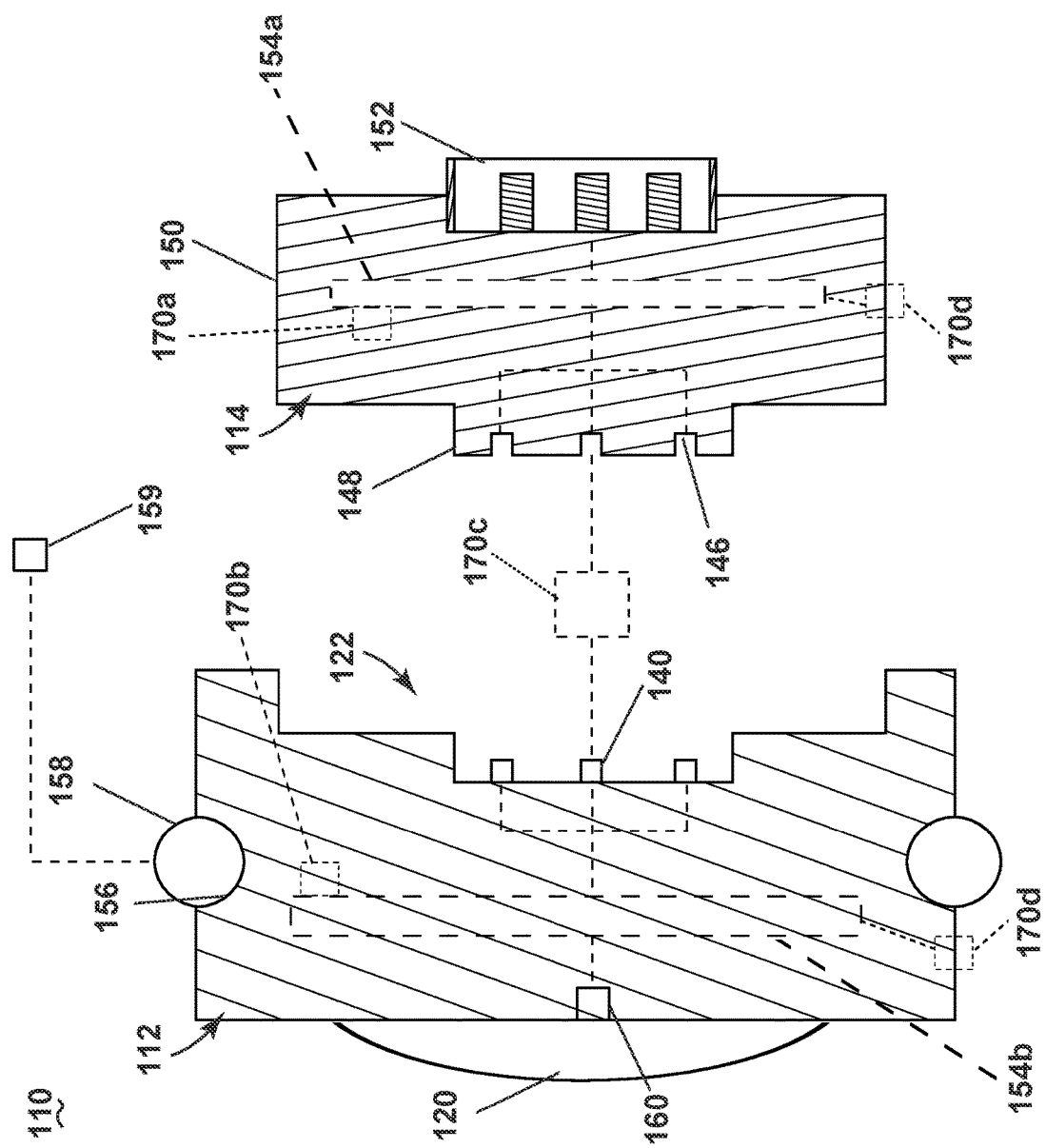
FIG. 3 is a sectional exploded view of a lighting assembly for a vehicle.

Referring to FIG. 3, a cross-sectional exploded view of the lighting assembly 110 better illustrates the attachment between the housing assembly 112 and the lighting assembly 110. In the sectional view, the light adaptor 114 includes a circuit board 154a, or other suitable controller or processor feature. As shown, the circuit board 154a can be wholly contained within the housing 150, such that the housing 150 protects the circuit board 154a from moisture or the exterior environment. It should be appreciated that the circuit board 154a can be a suitable controller for controlling and operating the lighting assembly 110. For example, the circuit board 154a can include a processor and memory for sending, receiving, interpreting, or generating electrical signals, instructions, or information for controlling and operating the lighting assembly 110. Additionally, it is contemplated that the light adaptor assembly 110 or circuit board 154a include a transmitter, capable of sending or receiving instructions either wirelessly, or via a wired connection through the light adaptor 114. A controller can control operation of the lighting assembly 110, such as controlling brightness, luminance, period or schedule for flashing operation, or even historical information related to operation of the lighting assembly 110, in non-limiting examples. It is also contemplated that other common electrical components typical with a circuit board can be utilized.

Further, it is contemplated that the circuit board 154a can include active circuitry. Active circuitry can include circuitry, a processor or microprocessor, a memory, a transceiver, or other circuitry which can oversee fault monitoring, as well as communication with the vehicle or vehicle system.

Further still, the circuit board 154a is shown as provided in the light adaptor 114, but need not be limited to the light adaptor 114. For example, the circuit board 154b can be provided in the housing assembly 112, as opposed to the light adaptor 114, and any processing or operations performed by the circuit board 154b can be communicated to or interpreted from the vehicle system or wiring harness through the light adaptor 114. Further yet, it is contemplated that the lighting assembly 110 includes two circuit boards 154a, 154b; one in the housing assembly 112, and one in the light adaptor 114, or even either of the housing assembly 112 or the light adaptor 114 including two circuit boards 154a, 154b. More specifically, the indication of a second circuit board 154b being limited to the housing assembly 112 need not limit the position of a first circuit board 154a to the light adaptor 114. Two circuit boards 154a, 154b can be advantageous for operating the lighting assembly while incorporating additional functionalities beyond merely lighting, such as utilizing a sensor 160 to make measurements and provide information or instruction via an electrical signal from the sensor 160, to the second circuit board 154b, through the electrical interface 140, 146, through the first circuit board 154a, and to a vehicle system at a connection to the adaptor connector 152. For example, the second circuit board 154b can periodically instruct the sensor 160 to make a measurement, such as every second. The second circuit board 154b can store, parse, or otherwise interpret a signal from the sensor 160 representative of a measurement. Then, the second circuit board 154b can determine a need to forward the signal, or generate another signal, to communicate to the vehicle system based upon a measurement from the sensor 160. In this way, the circuit board 154a, 154b can provide for additional functionality, beyond that of a typical light or lighting assembly, without requiring additional components, harnesses, wiring, or functionalities. The adaptor 114, not only can be tailored to the particular harness or connection types, but can also include tailored functionalities based upon the particular adaptor being used.

As is appreciable, the housing 150 of the light adaptor 114 can include an extension 148, shaped complementary to the recess 122 in the housing assembly 112, as well as a set of receptacles or electrical interfaces 146 complementary to the electrical interface 140. It should be further understood that the particular shapes or geometry as shown are exemplary, and that any suitable mating organization between the housing assembly 112 and the light adaptor 114 is contemplated. An organization or arrangement that seals the lighting assembly 110 at the junction between the housing assembly 112 and the light adaptor 114 is preferable, while it is noted that a seal can provide suitable sealing, without requiring a waterproof seal be formed by the junction alone without the seal.

A groove 156 for carrying a mounting grommet 158 can be provided in the housing assembly 112. The mounting grommet 158 can provide for mounting the housing assembly 112, and attached light adaptor 114, to a vehicle 159 or other suitable unit, while also maintaining the seal among the housing assembly 112 and the light adaptor 114. As schematically shown, the mounting grommet 158 mounts the housing assembly 112 to the vehicle 159. It should be further understood that a grommet need not be used to mount the lighting assembly 110 to the vehicle 159, but any suitable mounting assembly, unit, or means is contemplated.

An optional module 170a-170d (collectively referred to as 170) can be utilized with the lighting assembly 110. The module 170 can be utilized or incorporated into the lighting assembly in a variety of ways, a few non-limiting examples of which will be discussed herein. Generally, the module 170 can provide for additionally connection, instruction, communication control, or functionality for the lighting assembly. More specifically, the module 170 could provide Bluetooth®, or other technology communication standards (such as those promulgated by the IEEE) for operating, instructing, or communicating with the lighting assembly 110. Non-limiting examples of additional functionalities can include light pattern, such as flash or blink pattern, light frequency, light intensity, light color, luminance, brightness, or other suitable functionalities. Furthermore, such a module 170 could provide for control of such functionalities by the user. For example, an application or software utilized on a smart phone or other mobile device, or on the vehicle itself, can provide for operating such functionalities for the lighting assembly 110 remotely. Alternatively, the module 170 can be controlled by the circuit boards 154a, 154b, or other controller in communication with the lighting assembly 110.

In one example, the module 170 can be integrated within one or both of the circuit boards 154a, 154b. In the example where the module 170 is integrated with both circuit boards 154a, 154b, there can be two modules 170a, 170b.

In another example, the module 170c can be incorporated within the physical assembly of the lighting assembly 110. More specifically, the module 170c can be a dedicated module that is configured to mount, couple, or otherwise connect to the housing assembly 112. For example, the module 170c can be a physical component configured to connect to one or both of the housing assembly 112 or the light adaptor 114. It is envisioned that the module 170c could include connections or connectors complementary to the electrical interface 140, 146, or the adaptor connector 152, or any combination thereof. In such an example, the module 170c can operate as an intermediate structure between the light adaptor 114 and the housing assembly 112, providing communication, power, or both between the two.

In yet another example, the module 170c could connect to the adaptor connector 152, as well as including an additional matching connector on the module 170c to couple to the particular wiring harness. In still another example, there could be a dedicated connector receiver 172 provided on either of the housing assembly 112 or the light adaptor 114 for selectively connecting the module 170d to the lighting assembly 110.

Referring to FIGS. 4A-4C, the lighting assembly 110 as described herein can further include a sensor 160. A front view of the light assembly 110 is shown as three different variations for a sensor placement relative to the light 120. In FIG. 4A, the sensor 160a can be placed in the center of the light 120. The light 120 need not be circular, and the sensor 160a can be placed centrally, regardless of the shape of the light 120 or the lighting assembly 110.

FIG. 4B shows the sensor 160b provided along an edge 164 of the light 120. While shown at the bottom of the light 120, it should be appreciated that the sensor 160b can be provided along any edge 164, and need not be placed at the bottom as shown. Similarly, in FIG. 4C, the sensor 160c is provided as a band extending across the light 120, through the center of the light 120. Alternatively, it is contemplated that the band need not extend in a manner parallel to the edges of the lighting assembly 110, as shown, but can extend as the band in any angled orientation, relative to the lighting assembly 110, and need not extend through the center of the light 120, but can be offset from the center. Furthermore, it should be understood that the sensors 160 shown in FIGS. 4A-4C can be provided in any position or arrangement, and the disclosure should not be limited to those embodiments shown in FIGS. 4A-4C. Similarly, multiple sensors are contemplated.

The sensor 160 as described in FIGS. 4A-4C, can provide for generating a signal or other communication means. The generated signal or communication is sent to the circuit board 154a, 154b, where the signal can be parsed, saved, acted on, forwarded to another controller, or otherwise utilized. For example, signal can include serial data communication of the sensor functions. The signal can be two-way, including sending and receiving information, or even including systems or control elements capable of encoding or decoding information, transmission bus translation mechanisms, or other software, hardware, systems or otherwise needed to interface with the vehicle or the vehicle control system. In another example, the signal transmitting to or from the sensor 160 can be communicated remotely via the module 170. It is further contemplated that operation of the sensor 160 can be controlled by or incorporated into the functionality of the module 170. In this way, the lighting assembly 110 can not only provide for universal connection for vehicle harnesses, but for incorporating and providing additional information, functionality, or other services to the vehicle network via the sensor 160 in the light assembly 110.

It should be appreciated that integrating the sensor 160 into the lighting assembly 110 also provides for eliminating additional wiring harnesses or systems otherwise required for sensor implementation. More specifically, utilizing the sensor in the lighting assembly 110, which can be easily integrated into the vehicle system via the lighting assembly 110, can provide for minimizing the number of components required for the vehicle, as well as minimizing the need for additional wiring harnesses or connector types.

Figure 5:
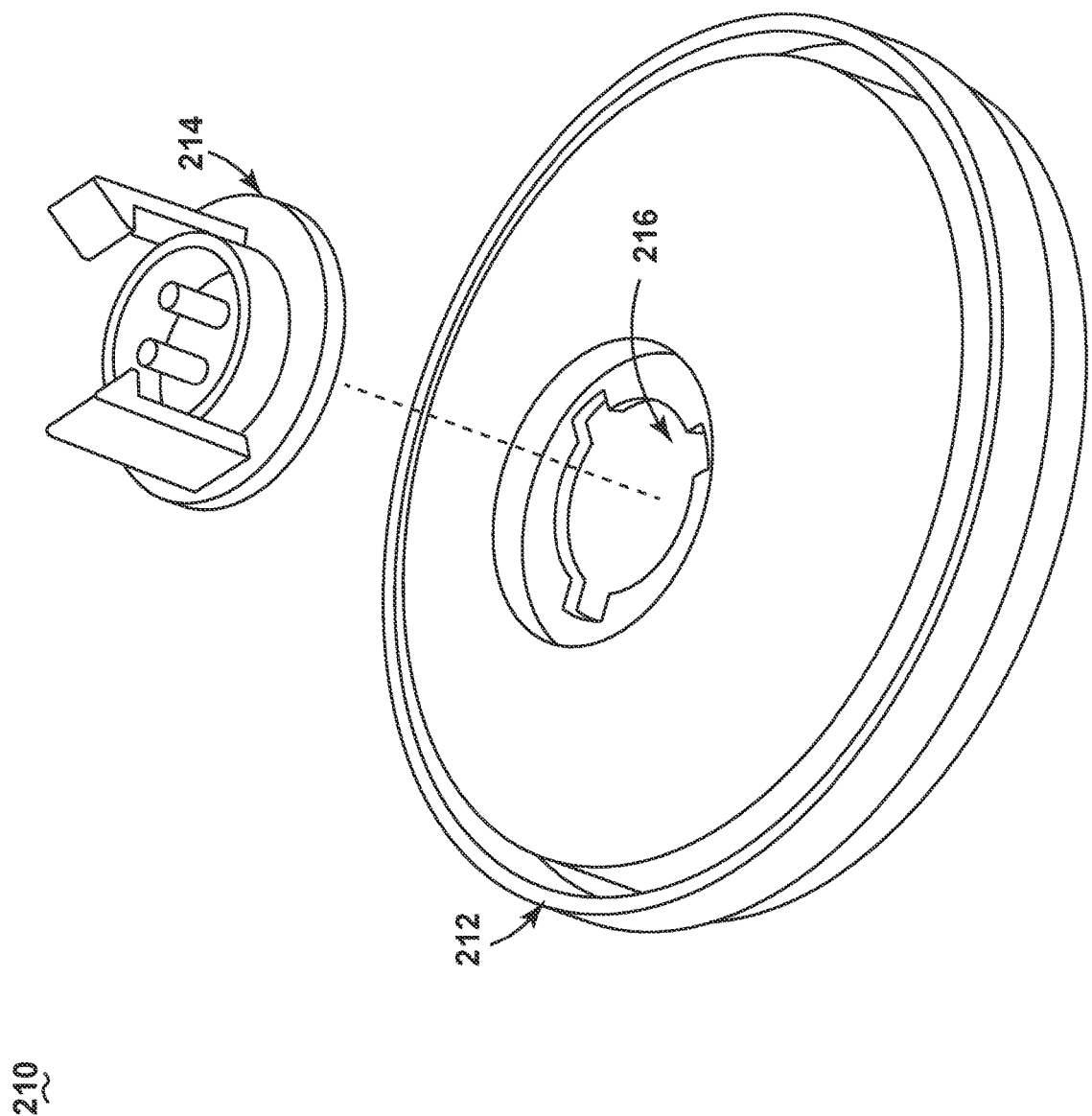
FIG. 5 is an exploded view of another lighting assembly.

Referring now to FIG. 5, another exemplary lighting assembly 210 is shown, having a differing method or means of attaching or switching among multiple connector or adaptor types. The lighting assembly 210 includes a housing assembly 212 and a light adaptor 214, similar to the lighting assembly 110 of FIGS. 2-4. However, the lighting assembly 210 is completed by inserting the light adaptor 214 into an opening 216 on the housing assembly 212, and then twisting the light adaptor 214 relative to the housing assembly 212 to secure the light adaptor 214 to the housing assembly 212, as well as electrically and communicatively coupling the light adaptor 214 to the housing assembly 212. The assembly of the light adaptor 214 to the housing assembly 212 is best described in FIG. 7.

Figure 6:
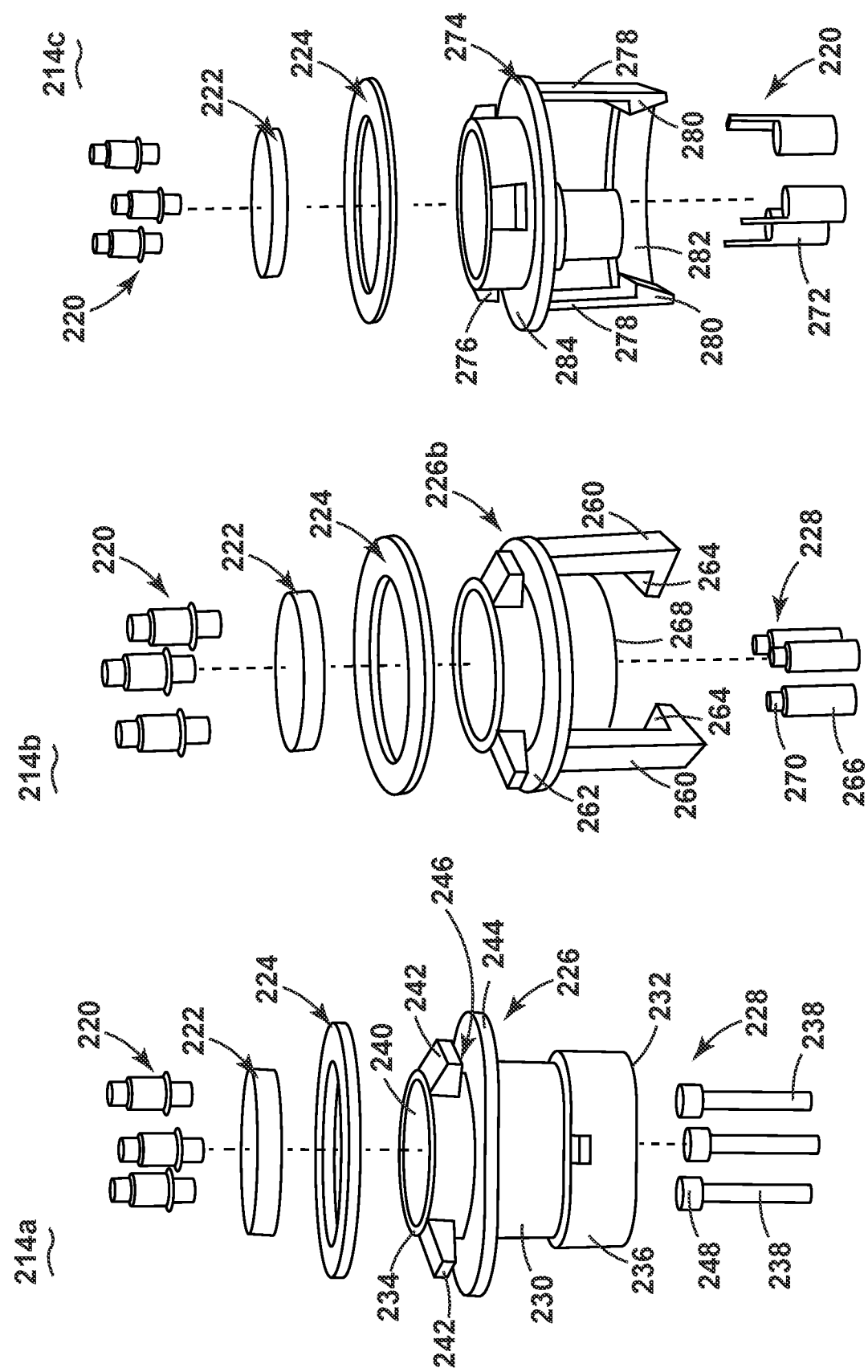
FIGS. 6A-6C show exploded views for three exemplary types of adaptors.

Referring to FIGS. 6A-6C, exploded views of three types of light adaptors 214 that can be interchangeably utilized with the lighting assembly 210 are shown. Referring to FIG. 6A, the light adaptor 214a is exploded into a set of spring inserts 220, a circuit board 222, a seal 224, a housing 226, and a set of terminal pins 228. It should be appreciated that the light adaptor 214a is oriented in a manner such that the spring inserts 220 electrically couple to the housing assembly 212, and the set of terminal pins 228 electrically couple to a power or operational source, such as a vehicle electrical or network system. In this way, the light adaptor 214a electrically couples the lighting assembly 210 to the vehicle power supply and electrical system.

The set of spring inserts 220 provide for compressibly retaining the light adaptor 214a with the housing assembly 212, as well as electrically and communicatively coupling the light adaptor 214 to the housing assembly 212. The circuit board 222, such as a printed circuit board, provides for electrically and communicatively coupling the light adaptor 214 to the housing assembly 212, via the spring inserts 220. Additionally, the circuit board 222 can have additional functionalities, such as creating a small circuit for interpreting or utilizing sensor information gathered by a sensor 160, or for formatting, parsing, interpreting, or otherwise communicating or utilizing sensor information with the rest of the electrical system, or sending instructions based upon measured sensor information.

The seal 224 can be formed as a ring in order to conform to the shape of the housing 226, while any suitable shape that effectively seals the light adaptor 214 is contemplated. The seal 224 can position on the underside of the housing 226, sealing between the housing of the light adaptor 214 and the housing assembly 212.

The housing 226 includes a body 230 having a first end 232 and a second end 234. The first end 232 can include a receptacle 236, which can be shaped, configured, or otherwise arranged to receive a standard connector or wiring harness. As shown, the receptacle 236 can include three prongs 238 for receiving a three-prong female connector to provide power or an electrical signal to the light adaptor 214a. The second end 234 can include a second receptacle 240, which can be sized complementary to the circuit board 222, for example. Additionally, a set of fingers 242 can extend from the second receptacle 240, which can be used to secure the seal 224 at the housing 226. The housing 226 can further include an annular band 244 provided between the first end 232 and the second end 234. The fingers 242 can be spaced from the band 244 to define a gap 246. The gap 246 can provide for containing the band 244, as well as providing for a security feature for securing the light adaptor 214a to the housing assembly 212. Such securing is best described in FIG. 7. The terminal pins 228 can include a hub portion 248, which can be used to mount the pins 228 within the first end 232, such that the pins 228 extend from within the body 230 at the first end 232.

Referring to FIG. 6B, the light adaptor 214b can be substantially similar to that of FIG. 6A, and therefore the discussion will be limited to the differences between the two. More specifically, the light adaptor 214b includes a set of tab arms 260 that extend away from a band 262. The tab arms 260 include a tab end 264 for securing a standard connector or wiring harness from the vehicle or electronics assembly. A set of pins 266 can be secured at a second end 268 of the housing 226b, but includes a smaller hub portion 270 as compared with that of FIG. 6A.

Referring to FIG. 6C, the light adaptor 214c can be substantially similar to that of FIGS. 6A and 6B, and therefore the discussion will be limited to the differences between the different figures. Specifically, the light adaptor 214c includes a set of receptacles 272 configured to receive a set of pins (not shown) from a wiring harness or electrical connector. Furthermore, a body 274 of the light adaptor 214c includes at least one extension 276, while multiple extensions are contemplated. The extension 276 can act as a keyway, providing for a specific orientation for connecting a wiring harness or connector to the light adaptor 214c. Further still, the light adaptor 214c includes a set of tab arms 278 as two tab arms 278, with opposing tab ends 280. A curved band 282 extends between the tab arms 278, and can follow the curvature of a band 284 of the body 274. Such a band 284 provides for improved structural integrity It should be understood that the light adaptors 214a, 214b, 214c of FIGS. 6A-6C are exemplary, and that variation from the particular arrangements as shown is contemplated. For example, features from one arrangement can be interchanged with, added to, or removed from another arrangement. Additionally, the light adaptors 214 need not be limited to those embodiments as shown, and other standard industry connectors or other suitable electrical connectors are contemplated.

Figure 7:
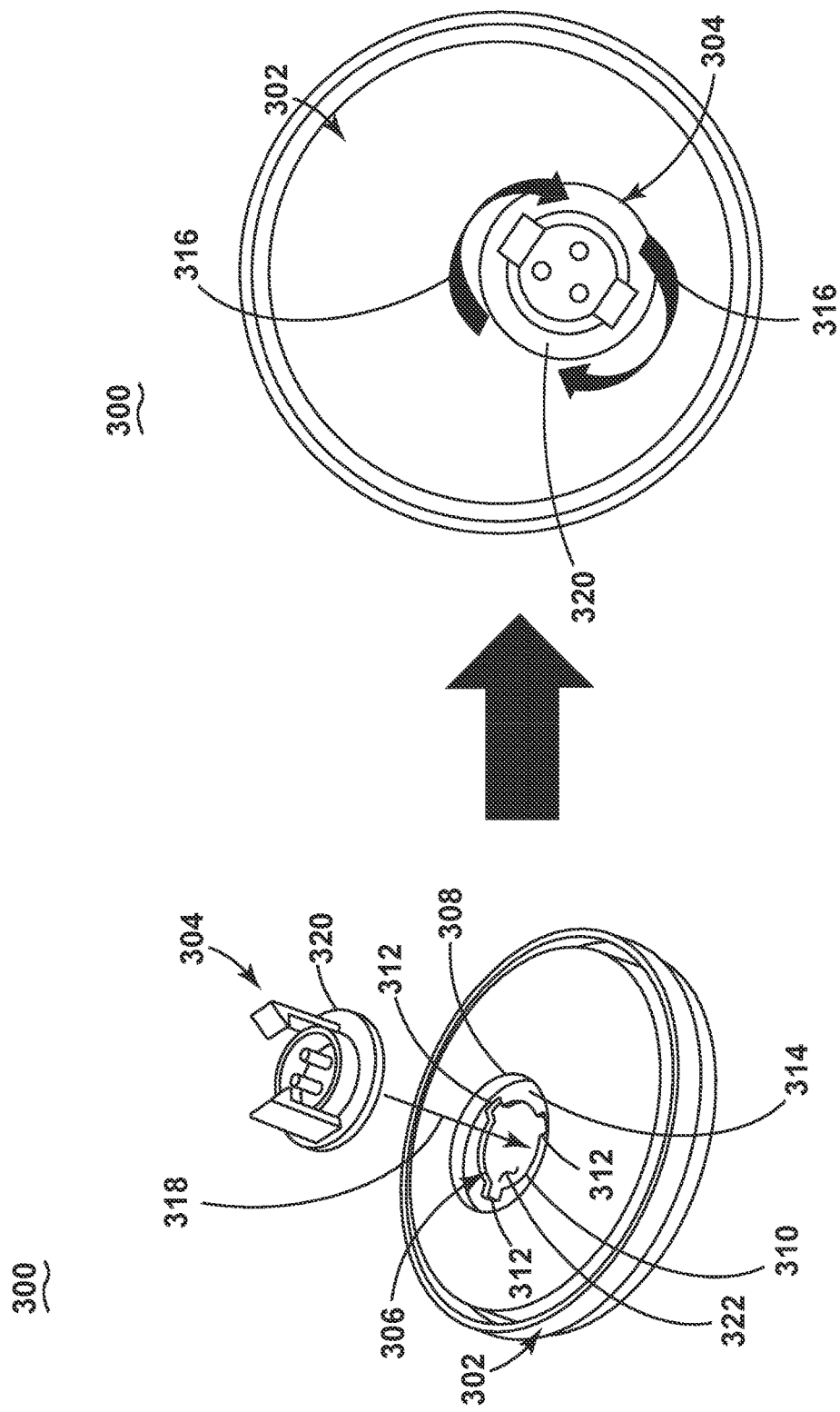
FIG. 7 shows a method of installing an adaptor to a housing for a lighting assembly.

Referring now to FIG. 7, the method of attachment for a lighting assembly 300, such as any light assembly as discussed herein, can be appreciated, and can include removably attaching, removing, or interchanging a light adaptor 304 with a complementary housing assembly 302. As is appreciable the housing assembly 212 of FIG. 5 and the light adaptor 214b of FIGS. 5 and 6B are shown, while any light assembly or component thereof as discussed herein is contemplated.

The housing assembly 302 includes an adaptor receptacle 306 that is complementary to the light adaptor 304. The adaptor receptacle 306 includes a recessed portion 308, as well as an aperture 310. The aperture 310 includes a set of tab openings 312 configured to receive a set of tabs on the light adaptor 304, such as the set of fingers 242 of FIG. 6A, for example. Initially, the user inserts light adaptor 304 into the receptacle 306, represented by arrow 314. Once inserted, the light adaptor 304 can be rotated within the receptacle 306, as represented by the arrows 316, until tabs (not visible in FIG. 7, but can be seen in FIGS. 6A-6C) are offset from the tab openings 312, such that the flange 314 is provided between a band 320, and the tabs. In this way, the light adaptor 304 is secured to the housing assembly 302 within the adaptor receptacle 306. Electrically coupling elements, such as the spring inserts 220 shown in FIGS. 6A-6C, can be provided between a circuit board 322 (within the housing assembly 302) and the light adaptor 304, to electrically and communicatively couple the particular light adaptor 304 to the housing assembly 302, to form a functional lighting assembly 300.

As is appreciable, a user or installer can quickly and readily switch the different adaptors to quickly and easily conform the lighting assembly to the particular vehicle. In this way, a user can incorporate the lighting assemblies as discussed herein into any vehicle system, without worry about be able to adapt to the particular wiring harness or electrical connector utilized with the particular vehicle.

For OEMs, the light assemblies as discussed herein can eliminate the requirement to buy lighting systems from the same manufacturer which provides them the wiring harness. Additionally, the light assemblies provide for using common lighting systems for any vehicle, regardless of the wiring harness or connector manufacturer. It improves commercial and engineering flexibility for OEMs.

For distributors or dealers, the light assemblies enable the distributors and dealers to inventory only a single housing assembly. The housing assembly is the most expensive part of the light system, and can be costly for a distributor or dealer to inventory multiple housing assembly types. The variable adaptor as described herein provides for quickly and easily changing the type of adaptor, which is the least expensive part of the system. It eliminates extraneous wiring, harnesses, connectors, lighting, sensors, and otherwise, which reduces cost and increases spacing availability for additional vehicle components.

For end users, the light assemblies provide for adapting existing lighting to new wiring harnesses, such as in a field replacement scenario, or eliminates the need to buy a new light or a jumper in the event there is an issue with the light, such as required replacement. Additionally, in the case of a replacement of a light, the replacement cost can be mitigated, as there is no need to find the correct wiring harness or connector for the particular lighting system. Thus, costs are reduced for the end user when needing to replace a wiring harness or connector, and enables the user to continue to use the particular light without replacing it.

Furthermore, the lighting assembly provides for lighting manufacturers to purchase or manufacture only a single housing assembly, with only a single adaptor. The adaptors can be used to match the light bodies as are needed to satisfy customer demand. This, in turn, requires a lower overall inventory, which saves costs while still adapting to any connector type.

Additionally, for standard or even customer-specific designs, the lighting assembly 110 provides for the use of any wiring harness from any manufacturer, and would not require a different harness or jumper to conform to any connector or vehicle type. This is a desirable solution for many customers or OEMs that are not looking to change or adapt existing wiring harnesses. Furthermore, the lighting assembly as described herein, at the time of initial vehicle assembly, can be adapted for any wiring harness utilized on the new build. This permits OEMs to reduce costs by seeking out lighting from multiple suppliers, rather than being limited to buying lighting from the manufacturers who have lighting that only connects to their wiring harness type. Further still, OEMs are also permitted to change wiring harness manufactures based upon customer need or specifications, without being forced to change lighting suppliers.

Aftermarket distributors, such as vehicle dealerships or service centers, often purchase commonly used lights to maintain in inventory. Utilizing the lighting assembly described herein, the aftermarket distributors can maintain inventory of the connector adaptors, which can enable the distributor to sell components or satisfy customer demand for specific connector types, without requiring an inventory for each different type. This reduces inventory and overall inventory investment.

Furthermore, the lighting assembly described herein provides for retrofitting existing vehicle assemblies with new technology, such as control systems that incorporate sensing technology, without the need to change the wiring harness, or worrying about trying to match the particular connector. Depending on the smart adaptor electronics, the sensors in the light or smart adaptor, and the controller that has access to the vehicle wiring, multiple active or passive sensing technology packages are envisioned. Examples of technology packages added to retrofit vehicles include, but are not limited to, reverse alert and sensing, turn alert and sensing, proximity to stationary or moving objects, signal (including visible light) exchange from stationary or moving objects, environmental conditions (such as temperature, weather, or road conditions), vehicle coordination with automated machines (from vehicles to transport devices to stationary infrastructures like gates or toll booths).

Many other possible aspects and configurations in addition to that shown in the above figures are contemplated by the present disclosure. To the extent not already described, the different features and structures of the various aspects can be used in combination with others as desired. That one feature cannot be illustrated in some of the aspects is not meant to be construed that it cannot be, but is done for brevity of description. Thus, the various features of the different aspects can be mixed and matched as desired to form new aspects, whether or not the new aspects are expressly described. In one non-limiting example, aspects of FIGS. 6A-6C may be combined or rearranged with one another in varying ways.

Non-limiting aspects of this invention can include:

A vehicle lighting assembly comprising: a housing assembly; a light; and an adaptor, removably connectable to the housing assembly, for electrically or communicatively coupling to the housing assembly, whereby the adaptor is replaceable at the housing assembly to interface with different configurations of wiring systems.

The vehicle lighting assembly of any preceding aspect wherein the housing assembly further includes a recess adapted to receive the adaptor.

The vehicle lighting assembly of any preceding aspect further comprising an electrical interface provided within the recess, whereby the housing assembly interfaces with the adaptor via the electrical interface.

The vehicle lighting assembly of any preceding aspect wherein the adaptor further includes another interface, complementary to the electrical interface of the housing assembly.

The vehicle lighting assembly of any preceding aspect wherein the recess includes a keyway, and the adaptor is shaped complementary to the keyway.

The vehicle lighting assembly of any preceding aspect further including a sensor.

The vehicle lighting assembly of any preceding aspect wherein the sensor is coupled with the housing assembly.

The vehicle lighting assembly of any preceding aspect further comprising a circuit board.

The vehicle lighting assembly of any preceding aspect wherein the sensor is electrically connected to the circuit board.

The vehicle lighting assembly of any preceding aspect wherein the housing assembly includes a second circuit board.

The vehicle lighting assembly of any preceding aspect wherein the circuit board is operably coupled to the second circuit board.

The vehicle lighting assembly of any preceding aspect wherein the sensor is positioned at one of a center of the light, an edge of the light, or as a band extending across the light.

The vehicle lighting assembly of any preceding aspect wherein the adaptor includes a circuit board.

The vehicle lighting assembly of any preceding aspect wherein the adaptor further includes a set of fingers spaced from a band to define a gap.

The vehicle lighting assembly of any preceding aspect wherein the lighting assembly mechanically attaches to the vehicle.

The vehicle lighting assembly of any preceding aspect wherein the adaptor comprises compressible material to seal the connection between the housing and the adaptor.

A vehicle light adaptor assembly comprising: a housing assembly including a receptacle with an electrical interface; a light coupled to the housing assembly; a set of adaptors, each removably connectable to the housing assembly at the electrical interface, for adapting the housing assembly to connect to a particular type of vehicle wiring harness; an adaptor controller provided within at least one adaptor of the set of adaptors; wherein the set of adaptors are interchangeable with the housing assembly at the receptacle to electrically couple any vehicle wiring harness to the light.

The vehicle light adaptor assembly of any preceding aspect wherein each adaptor of the set of adaptors includes the adaptor controller.

The vehicle light adaptor assembly of any preceding aspect further comprising a sensor.

The vehicle light adaptor assembly of any preceding aspect wherein the sensor is operated by the adaptor controller, when the at least one adaptor with the adaptor controller of the set of adaptors is connected to the housing assembly at the electrical interface.

A vehicle light assembly comprising: a housing assembly including a receptacle with an electrical interface; a light coupled to the housing assembly; a set of adaptors, each removably connectable to the housing assembly at the electrical interface, for adapting the housing assembly to connect to a particular type of vehicle wiring harness; a sensor; wherein the set of adaptors are interchangeable with the housing assembly at the receptacle to electrically couple any vehicle wiring harness to the light.

The vehicle light assembly of any preceding aspect further comprising a controller communicatively coupled to the sensor.

The vehicle light assembly of any preceding aspect wherein the controller is communicatively coupled to the light.

A method of installing a vehicle lighting assembly, the method comprising: connecting an adaptor from a set of adaptors to a housing assembly, whereby the adaptor from the set of adaptors is configured to connect to a vehicle electronics system.

The method of any preceding aspect wherein connecting further includes inserting the adaptor from the set of adaptors within a recess on the housing assembly.

The method of any preceding aspect further comprising rotating the adaptor from the set of adaptors within the recess to fasten the adaptor of the set of adaptors to the housing assembly.

A method of adapting a vehicle lighting assembly to a vehicle wiring harness, the method comprising: connecting an adaptor from a set of adaptors to a housing assembly, whereby the adaptor from the set of adaptors is configured to connect the vehicle lighting assembly to the vehicle wiring harness; and connecting the vehicle wiring harness to the vehicle lighting assembly at the adaptor from the set of adaptors connected to the housing assembly.

The method of any preceding aspect wherein connecting the adapter to the housing assembly further includes inserting the adaptor from the set of adaptors within an aperture on the housing assembly.

The method of any preceding aspect further comprising rotating the adaptor from the set of adaptors within the aperture to fasten the adaptor of the set of adaptors to the housing assembly.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle light adaptor assembly comprising:
    a housing having a first electrical interface, a sensor, and at least one light, wherein the at least one light is electrically connected with the first electrical interface, and wherein the sensor is configured to communicate a sensed value by way of the first electrical interface; and
    at least one adaptor comprising at least one adaptor connector and a controller including active circuitry for controlling operation of the vehicle light adaptor assembly based at least on the sensed value, the at least one adaptor connectable to the housing via the first electrical interface;
    wherein the at least one adaptor is electrically coupled to any vehicle wiring harness via the at least one adaptor connector.

2. The vehicle light adaptor assembly of claim 1, wherein the at least one adaptor further comprises at least one adaptor electrical interface complementary to the first electrical interface.

3. The vehicle light adaptor assembly of claim 1, wherein the controller includes a processor for communicating with a vehicle system.

4. The vehicle light adaptor assembly of claim 3, further comprising at least one module located in the housing or in the at least one adaptor, the at least one module providing communication between the vehicle system and the at least one light.

5. The vehicle light adaptor assembly of claim 4, wherein the controller is a circuit board integral with the at least one module.

6. The vehicle light adaptor assembly of claim 5, wherein the at least one module is multiple modules.

7. The vehicle light adaptor assembly of claim 6, further comprising at least one circuit board located in the housing and integral with at least one of the multiple modules.

8. The vehicle light adaptor assembly of claim 6, further comprising a dedicated connector receiver located in one of the housing or the adaptor for selectively connecting at least one of the multiple modules to the vehicle light adaptor assembly.

9. The vehicle light adaptor assembly of claim 3, wherein the controller is a circuit board with active circuitry for overseeing fault monitoring.

10. The vehicle light adaptor assembly of claim 1, wherein the sensor is in signal communication with the controller.

11. The vehicle light adaptor assembly of claim 10, further comprising an additional controller located in the housing and in communication with the sensor and the first electrical interface.

12. The vehicle light adaptor assembly of claim 11, further comprising at least one module located in the housing or in the at least one adaptor, the at least one module for controlling the sensor.

13. A smart adaptor assembly comprising:
    a light housing assembly defining a first electrical interface and comprising a light;
    at least one adaptor, apart from the light housing assembly, electrically connectable with the first electrical interface, for adapting the light housing assembly to connect to a particular type of vehicle wiring harness;
    a sensor adapted for sensing at least one sensed value; and
    a controller located within the at least one adaptor, the controller configured to receive the at least one sensed value from the sensor, and further configured for controlling operation of the light based on the at least one sensed value.

14. The smart adaptor assembly of claim 13, further comprising at least one module integral with the controller and for providing remote communication control of the smart adaptor assembly.

15. The smart adaptor assembly of claim 13, wherein the at least one sensor value is transmitted via at least one module or the at least one adaptor.

16. The smart adaptor assembly of claim 13, further comprising a second controller in signal communication with the light or the at least one adaptor for incorporating additional functionalities beyond controlling operation of the light.

17. The smart adaptor assembly of claim 16, wherein the sensor is electrically coupled to the light or the at least one adaptor.

18. The smart adaptor assembly of claim 17, wherein the sensor is capable of making measurements and in signal communication with the second controller.

19. The smart adaptor assembly of claim 18, wherein the second controller further comprises a processor for storing, parsing, or otherwise interpreting a signal representative of measurements made by the sensor.

* * * * *